United States Patent
Lowry et al.

(10) Patent No.: US 8,229,974 B2
(45) Date of Patent: Jul. 24, 2012

(54) MECHANISMS TO SUPPORT FINE-GRAIN NAMESPACING

(75) Inventors: Lee Edward Lowry, Orem, UT (US); Volker Gunnar Scheuber-Heinz, Pleasant Grove, UT (US); William Street, Orem, UT (US); Brent Thurgood, Spanish Fork, UT (US); Rajesh Vasudevan, Sandy, UM (US); Ryan Cox, Provo, UT (US); Stephen R Carter, Spanish Fork, UT (US)

(73) Assignee: EMC Corporation, Hopkinton, MA (US)

( * ) Notice: Subject to any disclaimer, the term of this patent is extended or adjusted under 35 U.S.C. 154(b) by 497 days.

(21) Appl. No.: 12/186,143

(22) Filed: Aug. 5, 2008

(65) Prior Publication Data

US 2010/0036869 A1 Feb. 11, 2010

(51) Int. Cl.
*G06F 17/30* (2006.01)
(52) U.S. Cl. ........................... 707/803; 717/120
(58) Field of Classification Search .................. 707/803, 707/999.103; 717/120; 719/313
See application file for complete search history.

(56) References Cited

U.S. PATENT DOCUMENTS

| | | | |
|---|---|---|---|
| 6,256,031 B1 | 7/2001 | Meijer et al. | |
| 6,687,701 B2 | 2/2004 | Karamanolis et al. | |
| 6,789,094 B2 | 9/2004 | Rudoff et al. | |
| 6,895,586 B1 * | 5/2005 | Brasher et al. | 719/313 |
| 7,065,784 B2 | 6/2006 | Hopmann et al. | |
| 7,143,421 B2 | 11/2006 | Forin et al. | |
| 7,181,473 B1 | 2/2007 | Lacouture et al. | |
| 7,734,951 B1 | 6/2010 | Balasubramanian et al. | |
| 2001/0034733 A1 * | 10/2001 | Prompt et al. | 707/102 |
| 2002/0078255 A1 | 6/2002 | Narayan | |
| 2003/0101434 A1 * | 5/2003 | Szyperski | 717/120 |
| 2003/0225753 A1 | 12/2003 | Balassanian et al. | |
| 2004/0172421 A1 * | 9/2004 | Saito et al. | 707/200 |
| 2005/0108632 A1 | 5/2005 | Friedman et al. | |
| 2006/0224603 A1 * | 10/2006 | Correll, Jr. | 707/100 |
| 2006/0236381 A1 | 10/2006 | Weeden | |
| 2007/0198458 A1 | 8/2007 | Pudipeddi | |
| 2007/0260630 A1 | 11/2007 | Balassanian | |
| 2009/0006888 A1 * | 1/2009 | Bernhard et al. | 714/6 |
| 2009/0063623 A1 * | 3/2009 | Brown et al. | 709/203 |

* cited by examiner

*Primary Examiner* — John Cottingham
*Assistant Examiner* — Noosha Arjomandi
(74) *Attorney, Agent, or Firm* — Barry N. Young

(57) ABSTRACT

Mechanisms to support fine-grain namespacing are provided. When an object is to be loaded within a processing environment, a specific namespace for that object is dynamically resolved during the load. That namespace can be dynamically resolved via object inheritance, via specific object-attribute declaration, and/or via consultation with a namespace object.

23 Claims, 3 Drawing Sheets

MECHANISMS TO SUPPORT FINE-GRAIN NAMESPACING

Collaborative environments are becoming pervasive in the industry. One area of collaboration that is critical to an enterprise is that which is associated with software development.

For example, in a team environment, such as in a software code development environment, many organizations desire to share underlying coding models (object hierarchies) across different projects. With traditional approaches, sharing models can be extremely problematic especially when the models that are to be shared utilize different namespaces (storage mechanisms and interfaces to define, name, and retrieve resources).

As a result, enterprises often elect to not share and rather to copy object and sub-object hierarchies over into new namespaces requiring laborious software porting exercises that can sometimes take longer to establish than it would to take to just develop the software for the copied objects (sub-hierarchies) from scratch. This also results in having multiple instances of objects and object hierarchies, each of which need to be supported and maintained by enterprise personnel. Therefore, this scenario is not a desirable situation for any enterprise.

In still other instances, elaborate proprietary super models are created by enterprises in an attempt to intertwine projects, which try to share namespaces or objects. This situation causes the super model to become extremely fragile and as more projects want to share the super model, the super model becomes untoward and impractical to maintain.

In fact, often an enterprise just wants a project to share the structure (fields and hierarchy) associated with an object and some of the associated data that populates some fields of that object. So, it would be a tremendous benefit to be able to permit this without having to create copies of objects and object hierarchies and without having to engage in namespace software porting exercises. Basically, enterprise developers may just want to slightly customize an object from one project for use in a different project but the existing namespace issues often become a show stopper; this should not be the case.

Thus, improved mechanisms are needed for namespacing.

SUMMARY

In various embodiments, mechanisms to support fine-grain namespacing are provided. More specifically, and in an embodiment, a method is provided for object namespace resolution. A request is received for loading an object. In response to that request, a namespace for the object is resolved; the namespace is specific to the object. Finally, the object is loaded to that namespace for purposes of satisfying the request.

DETAILED DESCRIPTION

Figure 1:
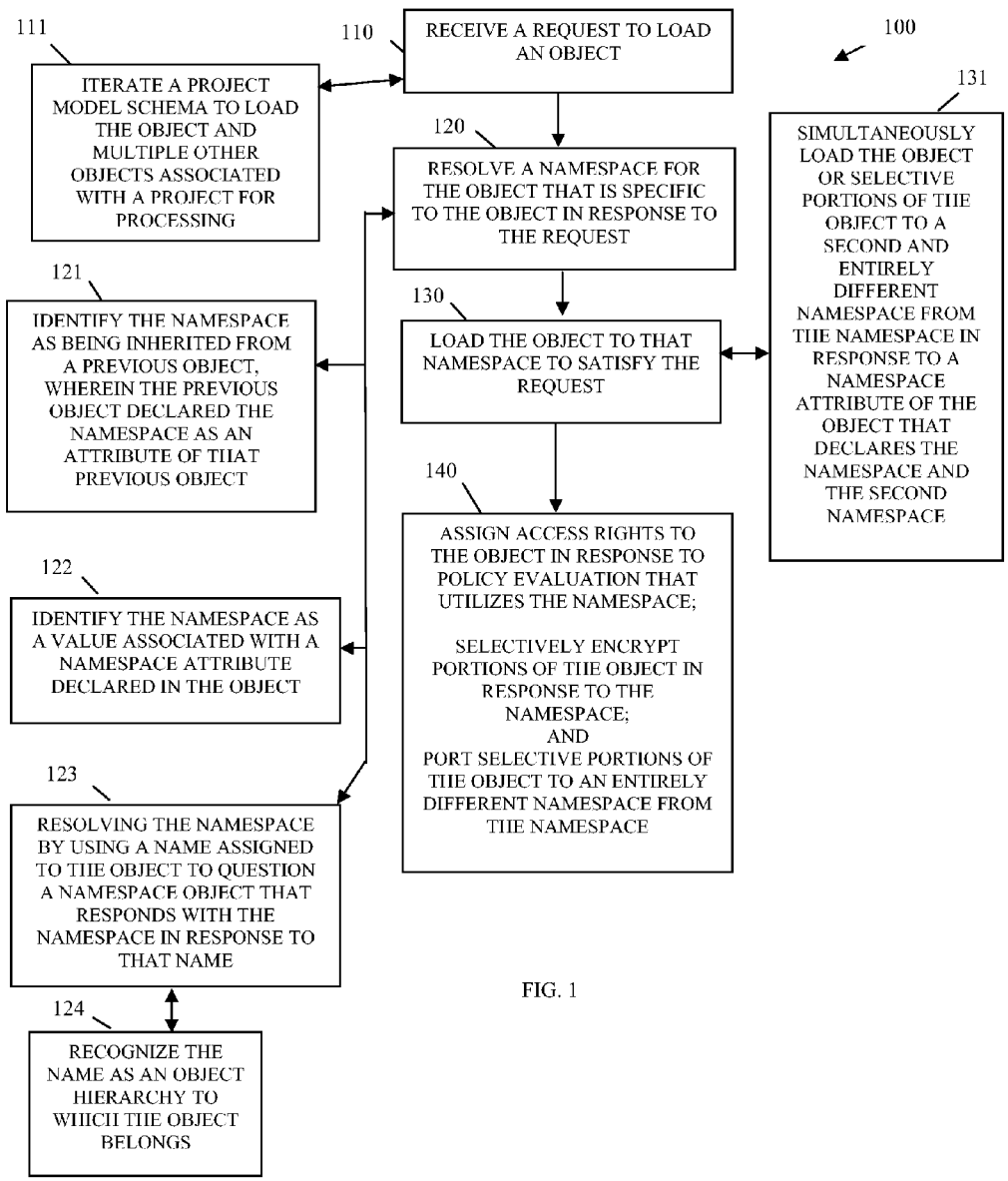
FIG. 1 is a diagram of a method for object namespace resolution, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

An "object" is a particular type of resource that processes as instructions on a machine, such as a computer. The phrase "software module" and the term "object" may be used interchangeably herein and below. Thus, an object is a set of instructions implemented on a computer-readable storage medium that processes on a computer.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

A "project processing environment" is a processing environment in which any portion (resource) of a project processes within. So, some portions of a project may process within the project processing environment whereas other potions of the project use different processing environments.

A "namespace" refers to a particular context and set of storage interfaces that a particular resource (such as an object) utilizes within its processing environment. So, one namespace may be a specific directory system whereas another namespace may be a relational database system, such as Structured Query Language (SQL). Resources are uniquely named, defined, and referenced within their particular namespace. Also, interfaces (Lightweight Directory Access Protocol (LDAP), SQL, etc.) for accessing, creating, deleting, and modifying resources are consistent within a particular namespace.

Various embodiments of this invention can be implemented in existing network architectures, project processing environments, proxies, directory systems, operating systems, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for object namespace resolution, according to an example embodiment. The method 100 (hereinafter "fine-grain namespace resolution service") is implemented as instructions in a machine-accessible and readable medium. The instructions when executed by a machine (processor and memory enabled device, such as a computer, etc.) perform the processing depicted in the FIG. 1. The fine-grain namespace resolution service is also operational over and processes within a network. The network may be wired, wireless, or a combination of wired and wireless.

As will be more fully described herein and below, the fine-grain namespace resolution service permits a namespace to be declared in a manner that is specific to a single object of an object hierarchy or even specific to just a portion of that object. The object or the portion of that object is also loaded to its resolved namespace for subsequent processing.

Initially, a project processing environment is established. The project processing environment includes a network of machines having a same or multiple different processing environments within which each machine (computer) operates. A project is defined via a schema definition and that schema definition defines each of the objects that process within the context of the project and the relationships that exists between the objects of the project.

At 110, the fine-grain namespace resolution service receives a request to load an object. This request can be received or generated within the processing environment in a variety of manners.

For example, at 111, the fine-grain namespace resolution service iterates a project model schema to load the object and to load multiple other objects associated with a project for processing.

In other cases, the fine-grain namespace resolution service can receive the request via a resource initiated attempt to launch or process the object. In some of these cases, the fine-grain namespace resolution service can be installed as a proxy that intercepts such attempts and generates the request that is received for processing at 110. The resource can be a physical resource, such as a user, a machine, device, etc. Alternatively, the resource can be a logical resource, such as an application, service, system, etc.

At 120, the fine-grain namespace resolution service resolves a namespace for the object that is specific to the object. Conventionally, the object is loaded within the namespace to which the loader is associated, to which operating system is associated, to which processing environment is associated, or to which object hierarchy for the object is associated. Namespacing loading that is specific to an object was not available with conventional approaches; however, fine-grain namespace association, namespace declaration, and namespace load mechanisms are taught herein with embodiments of the fine-grain namespace resolution service.

The resolution of a namespace for a particular object can be done in a variety of manners.

For example, at 121, the fine-grain namespace resolution service identifies the namespace as being inherited from a previous object. That is, while the fine-grain namespace resolution service processes an project model schema having the object and many other objects, there is a relationship defined or established between the object and one of the previously processed objects such that the previous object's declared namespace is inherited by the object being loaded by the fine-grain namespace resolution service. Example illustrations associated with this are presented in detail below.

In another case, at 122, the fine-grain namespace resolution service identifies the namespace as being an assigned value to an attribute of the object. So, an object can include an attribute declaration that identifies the namespace, such as "NAME SPACE=SQL," where the declared namespace is SQL. Again, example illustrations of this scenario are also presented herein and below.

In yet another case, at 123, the fine-grain namespace resolution service can use a name or identifier associated with the object to query or question a special type of object within the processing environment. That special type of object is a namespace object. The namespace object is independent of any particular object and includes identifiers or names for the objects of the processing environment, such that the namespace object can use the name of any particular object and return to the fine-grain namespace resolution service a specific namespace that is to be used for that object. Example illustrations for this scenario also presented in detail below.

Continuing with the embodiment of 123 and at 124, the fine-grain namespace resolution service recognizes the name for the object as an object hierarchy to which the object belongs. The namespace object can provide a namespace based on the specific object name or based on the object hierarchy to which the object belongs.

Once the fine-grain namespace resolution service has resolved the namespace for the object, at 130, the fine-grain namespace resolution service loads the object to the resolved namespace to satisfy the load request.

According to an embodiment, at 131, the fine-grain namespace resolution service simultaneously loads the entire object or portions of the object to a second and entirely different namespace, which is different from the initial namespace discussed at 130. This is done in response to a namespace attribute associated with the object that declares multiple namespaces, namely, the namespace and the second namespace.

So, an object can not only have its own specific, unique, and separate namespace from that which is associated with other objects of a project but a single object can use and declare multiple different and disparate namespaces for use within the project processing environment. Illustrative examples are presented below.

In an embodiment, at 140, the fine-grain namespace resolution service can perform a variety of additional processing all in response to the assignment of the fine-grain namespace to the object. Each of these listed processing scenarios can occur, just one can occur, or various combinations can occur. So, in one case, the fine-grain namespace resolution service assigns specific access rights to the object in response to policy evaluation that utilizes the namespace assignment. In another case, the fine-grain namespace resolution service selectively encrypts portions of the object being loaded in response to the namespace assignment and in view of policy evaluation. In yet another situation, the fine-grain namespace resolution service ports selective portions of the object to second and entirely different namespaces from the namespace to which the object is initially being loaded.

In fact, any policy evaluation or custom configuration of the object within the namespace can occur in response to the namespace that is associated with the object. Some examples of this are presented below.

It is now appreciated how the fine-grain namespace resolution service can be processed within a project processing environment to achieve fine-grain loading, resolution, and custom assignment on an object basis or a portion of a single object basis. Some illustrative examples and descriptions are now presented for further comprehension of the features associated with the fine-grain namespace resolution service.

ILLUSTRATIVE EXAMPLES AND DESCRIPTIONS

The fine-grain namespace resolution service is a mechanism for achieving namespacing of data in a data model all the way down to the attribute level of an object. This is a namespace deeply woven through every aspect of the model and a supporting mechanism that allows for traversal of that namespace and serialization of the objects based on that namespace.

With the namespacing model used, whenever an object is created, the fine-grain namespace resolution service can stamp the namespace on that object. If the fine-grain namespace resolution service does not stamp a namespace on that object, then the object inherits the namespace of its parent object, and so on.

Using the example in the diagram below, let's say that there are three products that are sharing a MailServer object. Product A is based on eDirectory® (distributed by Novell, Inc. of Provo, Utah) for its deployment data store and only uses "Name" and "IPAddress"; it has no knowledge of the other MailServer attributes.

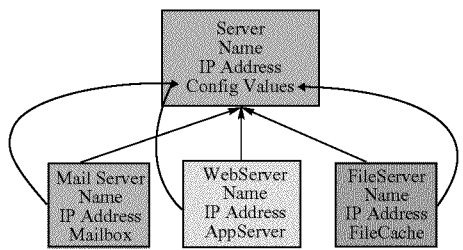

Product B is built on Product A and assumes that there is a Name and IP Address that it can use from product A. However, it also uses "ConfigValues", which it deploys to a database.

Product C is the same as product B, except that it stores Mailbox to an App Server when it goes to deploy the solution.

The following shows how namespacing can be applied using fine-grain namespace resolution service to allow these products to work generically as described above.

```
<Object name="Server" type="Server">
  <attributes>
      <attr name="ConfigValues" value="<huge blob of data>"
      namespace="MySQL"/>
  </attributes>
  </Object>
  <Object name="MailServer1" type="MailServer" inherits="Server">
  <attributes>
      <attr name="Name" value="Mail Server 1"
      namespace="eDir"/>
      <attr name="IPAddress" value="111.111.111.11"
      namespace="eDir"/>
      <attr name="Mailbox" value="1482"
      namespace="AppServer"/>
  </attributes>
  </Object>
```

What this allows is now each product can build up a bunch of services that can operate on the data in terms of namespaces. Better yet, a general service in the framework that all of these products use can do key operations purely based on namespacing. This can provide a tremendous amount of consistency across products, a huge amount of in-the-box services in the framework, and endless amounts of flexibility.

Some specific applications of the fine-grain namespace resolution service mechanism is (but is not limited to) the following:

1. the model save process (each namespace can have a separate root);
2. a deployment process for getting the model deployed out to a target system (scripts, etc.) with just the information that that target system understands;
3. a version control process—so that a generic version control adapter can know which files it is responsible for versioning, merging, representing in the view, etc.;
4. model checker process for knowing which objects and/or attributes to check;
5. staging objects from one environment to another;
6. building a VM (Virtual Machine); and
7. running YAST (Yet Another Setup Tool) to pull things together to do some desired operation.

The fine-grain namespace resolution service utilizes generic deployment code that knows how to deploy eDirectory® data to an eDirectory® server. Instead of hard-coding the "Name" and "IP Address", the fine-grain namespace resolution service:

1. iterates over all objects in the model;
2. checks to see if the object has attributes of namespace type "eDir";
3. if Yes, deploys the data; and
4. if No, skips and goes on.

When product B and C goes to deploy (or check, or version control, etc.), they can similarly process only the data that they understand and skip the rest.

Flexibility and Extensibility

The fine-grain namespace resolution service also provides great flexibility with future products and feature add-ons to an existing product. Let's say that a year after shipping Product A, one adds some new great feature to it that uses a new eDirectory® attribute called "Port". And, let's say a 3$^{rd}$ Party ships a product based on Product A that adds an eDirectory® attribute called "Schema". These new features and products can be dropped into an existing installed based of Product A and Product A is able to deploy, check, version control, or do whatever namespace-based service on those extended models that are available at that time.

The following diagrams illustrates this extensibility of the fine-grain namespace resolution service:

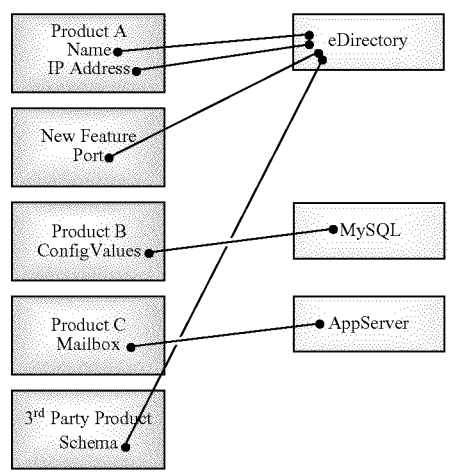

Variations

There are several additional "advanced" capabilities that can be added to the model namespacing syntax to facilitate the operations of the fine-grain namespace resolution service. The following are some practical examples:

1. Inherited Namespaces

```
<Object name="Server" type="Server">
  <attributes>
    <attr name="ConfigValues" value="<huge blob of data>"
      namespace="MySQL"/>
  </attributes>
</Object>
<Object name="MailServer1" type="MailServer" inherits="Server"
  namespace="eDir">
  <attributes>
    <attr name="Name" value="Mail Server 1"/>
    <attr name="IPAddress" value="151.155.160.17"/>
    <attr name="Mailbox" value="1482"
      namespace="AppServer"/>
  </attributes>
</Object>
```

This permits one to declare a namespace on an object, which means that all attributes of that object are automatically part of that namespace. One can override a namespace by declaring a different namespace on any attribute.

2. Multiple Namespaces

```
<Object name="Server" type="Server">
  <attributes>
    <attr name="ConfigValues" value="<huge blob of data>"
      namespace="MySQL"/>
  </attributes>
</Object>
<Object name="MailServer1" type="MailServer" inherits="Server"
  namespace="eDir">
  <attributes>
    <attr name="Name" value="Mail Server 1"/>
    <attr name="IPAddress" value="151.155.160.17"/>
    <attr name="Mailbox" value="1482" namespace="AppServer,
      eDir, SQL"/>
  </attributes>
</Object>
```

This shows that the "Mailbox" attribute belongs to 3 different namespaces.

3. Independent Namespace Schema for Deeper Expression

```
<Object name="Server" type="Server">
  <attributes>
    <attr name="ConfigValues" value="<huge blob of data>"/>
  </attributes>
</Object>
<Object name="MailServer1" type="MailServer" inherits="Server" >
  <attributes>
    <attr name="Name" value="Mail Server 1"/>
    <attr name="IPAddress" value="151.155.160.17"/>
    <attr name="Mailbox" value="1482" />
  </attributes>
</Object>
<namespaces>
  <namespace class="Server" type="eDir">
    <attribute name="Name" type="eDir" required="true"/>
    <attribute name="Mailbox" type="AppServer, eDir, SQL" />
  </namespace>
</namespaces>
```

Rather than declare a namespace as an attribute embedded in the data file, in some cases it is cleaner to declare namespaces separately in a namespace file. This allows for much more power because namespaces can become objects in and of themselves and one has more freedom to declare attributes on the namespace and to let the namespace live independently of the data.

In the above example, one can now generically telegraph to the application (or generic service) that "name" is required. A practical application of this is that the deploy mechanism proceeds if the name attribute on Server is missing. One can start to blend in the concept of Schema into namespaces and even put syntax rules on different aspects of one's data model in a generic way.

Once a namespace is declared for a certain object, the fine-grain namespace resolution service can also assume that any object underneath that object is of that same namespace.

4. Optimization with Model Loading

With the concept of namespacing, the fine-grain namespace resolution service can choose to only load objects of a certain namespace, based on what the product wants. This can save memory and processor load time. Over time, as more and more products share the same core model, the size of the model can grow to be quite large and one has the risk of incurring quite a penalty and overhead for such a model. But, this can be solved by only loading objects that a particular product cares about. The following shows an example:

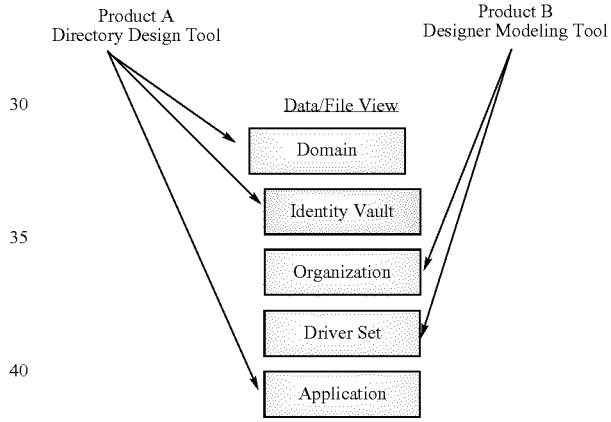

When product A interacts and wants the children of "Domain", the fine-grain namespace resolution service can choose to only load the Identity Vault and Application and ignore the others.

5. Encryption & ACLs Based on Namespace

With the concept of namespaces, the fine-grain namespace resolution service can serialize certain parts of the model to disk differently. For example, if the eDirectory® namespace needed more security, it could serialize just those objects with encryption.

Also, access to objects can be controlled based on namespace. For example, one can define that users of type "Admin" can only load and see objects from the eDirectory® namespace.

6. Mapping Items From one Namespace to Another

Here, items of one object can be mapped to different namespaces from one another as discussed above.

Figure 2:
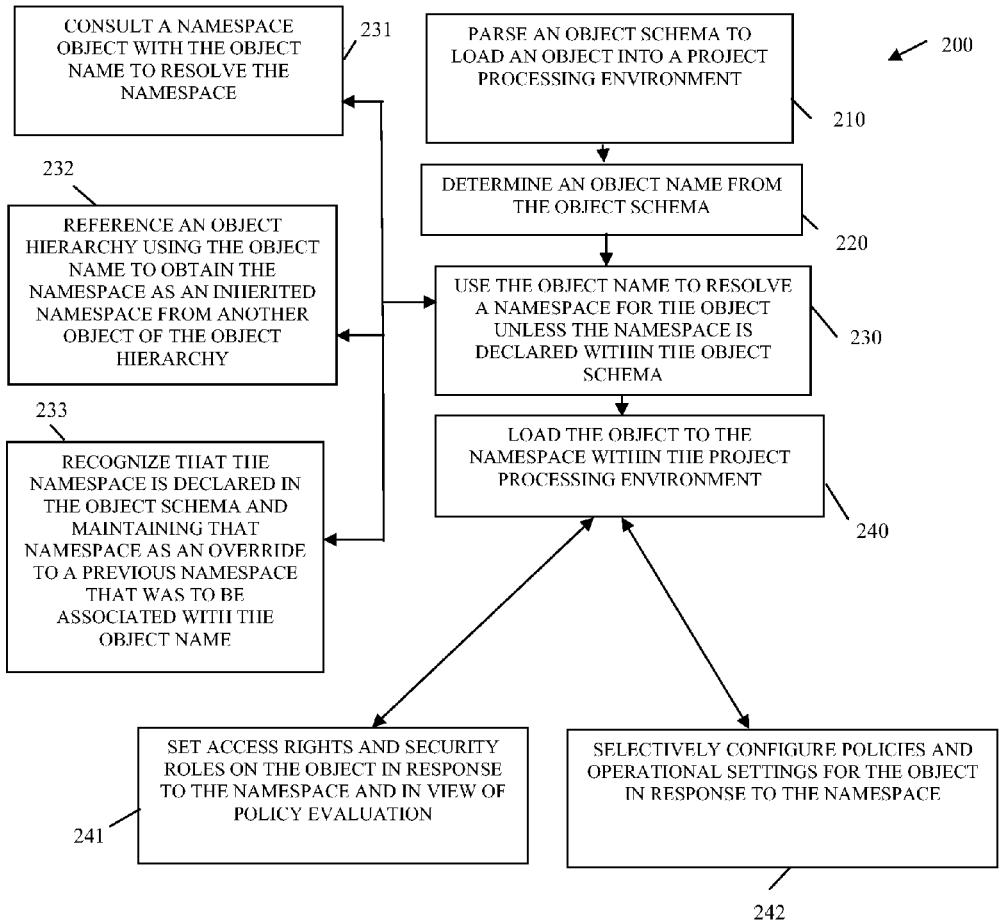
FIG. 2 is a diagram of another method for object namespace resolution, according to an example embodiment.

FIG. 2 is a diagram of another method 200 for object namespace resolution, according to an example embodiment. The method 200 (hereinafter "namespace loading service") is implemented as instructions in a machine-accessible and readable medium. The instructions when executed by a machine perform the processing depicted in the FIG. 2. The namespace loading service is also operational over and processes within a network. The network may be wired, wireless, or a combination of wired and wireless.

The namespace loading service represents another processing perspective to the fine-grain namespace resolution service represented by the method 100 discussed above with the FIG. 1.

At 210, the namespace loading service parses an object schema to load an object into a project processing environment. The object schema defines the syntax and structure of the object and provides a mechanism for properly loading the object into the project processing environment. Again, the project processing environment may include multiple different and disparate processing environments logically communicating with one another to represent a project defined by a project model schema.

At 220, the namespace loading service determines an object name or object identifier from the object schema.

At 230, the namespace loading service uses the object name to resolve a namespace for the object unless the namespace is declared within the object schema. That is, the namespace loading service resolves the object's namespace based on context within which the object is being loaded unless the object itself overrides this context and explicit declares the namespace. Use of the object name to resolve the namespace can occur in a variety of manners.

For example, at 231, the namespace loading service consults an independent and separate namespace object with the name of the object to acquire the namespace that is to be associated with the object. Examples of this were provided in detail above with the illustrations that followed the discussion of the FIG. 1.

In another situation, at 232, the namespace loading service references an object hierarchy using the object name to obtain the namespace as an inherited namespace from another object of the object hierarchy. This is an example of object inheritance for namespace resolution performed by the namespace loading service during the load of the object in a dynamic and real time fashion.

In yet another case, at 233, the namespace loading service recognizes that the namespace is actually declared in the object schema. Here, the namespace loading service maintains that namespace as an override of a previous namespace that was to be associated with the object name based on that object's hierarchy.

At 240, the namespace loading service loads the object to the resolved namespace within the project processing environment. The namespace was specific to the object and dynamically resolved.

In an embodiment, at 241, the namespace loading service sets access rights and security roles on the object within the namespace. This is done in response to the namespace and in view of policy evaluation.

In another case, at 242, the namespace loading service selectively configures policies and operational settings for the object in response to the namespace assigned to the object.

Thus, configuration, security, and profiles may all be established in response to a particular namespace that an object is deployed to. So, if an object is deployed to one namespace the associated security and configuration can be different from what occurs when the object is deployed to another different namespace.

Figure 3:
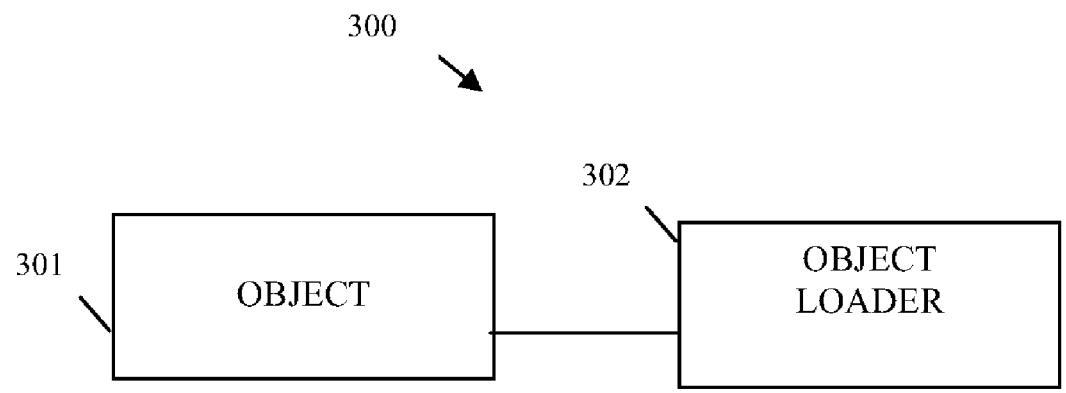
FIG. 3 is a diagram of a fine-grain object namespacing resolution system, according to an example embodiment.

FIG. 3 is a diagram of a fine-grain object namespacing resolution system 300, according to an example embodiment. The fine-grain object namespacing resolution system 300 is implemented as instructions on or within a computer-readable storage medium and a machine-accessible and readable medium. The instructions when executed by a machine (computer, etc.) perform various aspects of the processing depicted with respect to the method 100 of the FIG. 1 and the method 200 of the FIG. 2. The fine-grain object namespacing resolution system 300 is also operational over a network and the network may be wired, wireless, or a combination of wired and wireless.

The fine-grain object namespacing resolution system 300 includes an object 301 and an object loader 302. Each of these components and their interactions with one another will now be discussed in turn.

The object 301 is implemented in a machine-accessible and a computer-readable storage readable medium and is to process on a machine within of the network. Some example aspects of the object 301 were presented above with reference to the methods 100 and 200 of the FIGS. 1 and 2, respectively.

In an embodiment, the object 301 is part of an object hierarchy for a project. The namespace that is to be associated with the object 301 is inherited from its context within the hierarchy.

In another case, the object 301 includes a specific attribute declaration that includes a namespace for the object 301.

The object loader 302 is implemented in a machine-accessible and computer-readable storage medium and is to process on the same machine as the object 301 or an entirely different machine of the network. Example processing associated with the object loader 302 was presented in detail above with reference to the methods 100 and 200 of the FIGS. 1 and 2, respectively.

The object loader 302 selectively and dynamically loads the object 301 to a particular namespace that is to be specifically associated with the object 301. That is, the namespace assignment to the object 301 is independent of other namespaces and other namespace assignments associated with other objects. This is the case even when the object 301 and the other objects are all part of the same object hierarchy. So, there is a fine-grain level of namespace assignment at the object level. In some cases, this assignment can also be done at the sub-object or item level.

According to an embodiment, the object loader 302 loads the object 301 to the namespace and simultaneously to at least one other different namespace. So, as an example, the object 301 can be loaded to eDirectory® and at the same time SQL.

In a particular situation, the object loader 302 (as was discussed above) resolves the namespace via inheritance from the object hierarchy. Again, this can also occur via a namespace attribute value declared in the object 301. Alternatively, in some cases the object loader 302 consults an independent namespace object with a name for the object 301 to acquire the namespace.

In some embodiments, the object loader 302 can also set resource roles, access rights, and configuration settings for the object 301 within the namespace based on the namespace associated with the object 301.

Figure 4:
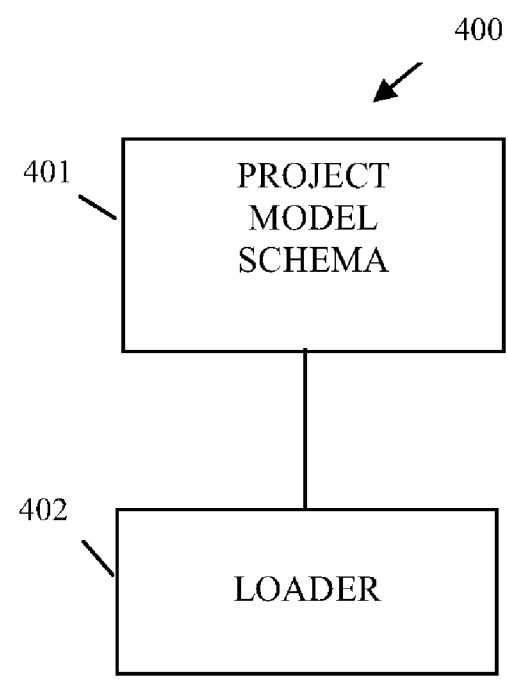
FIG. 4 is a diagram of another fine-grain object namespacing resolution system, according to an example embodiment.

FIG. 4 is a diagram of another fine-grain object namespacing resolution system 400, according to an example embodiment. The fine-grain object namespacing resolution system 400 is implemented as instructions on or within a machine-accessible and computer-readable storage medium. The instructions when executed by a machine (such as a computer) perform various aspects of the processing depicted with respect to the methods 100 and 200 of the FIGS. 1 and 2, respectively, and processing associated with the system 300 of the FIG. 3. The fine-grain object namespacing resolution system 400 is also operational over a network and the network may be wired, wireless, or a combination of wired and wireless.

The fine-grain object namespacing resolution system 400 includes project model schema 401 and a loader 402. Each of these components and their interactions with one another will now be discussed in turn.

The project model schema 401 is implemented in a machine-accessible and computer-readable storage medium and defines objects which process on one or more machines of a network.

The project model schema 401 defines objects that process within a processing environment on the one or more machines and that cooperate with one another to logical form a project.

The project model schema 401 includes a definition for a project and the project includes a variety of definitions for objects that processing within the project. Each object can include assignments to specific namespaces for which that object is to be deployed or a variety of mechanisms exists (as discussed in detail herein and above) that permit specific namespaces to be resolved from the objects.

The loader 402 is implemented in a machine-accessible and readable medium and to process one of the machines of the network. Example processing associated with the loader 402 was described in detail above with reference to the methods 100 and 200 of the FIGS. 1 and 2, respectively, and with respect to the system 300 of the FIG. 3.

The loader 402 parses the project model schema 401 to selectively load the objects defined in the project model schema 401 into multiple namespaces. Again, these loaded objects within their own namespaces cooperate as a project that is defined by the project model schema 401. Each object's particular namespace is resolved by the loader 402 from the project model schema 402.

According to an embodiment, some of the namespaces are explicitly defined within the project model schema 401 via attribute declarations assigned to some of the objects.

In another case, some of the namespaces are implicitly resolved via relationships between some of the objects that are present within the project model schema 401.

In yet another situation, some of the namespaces are resolved by consulting a namespace object with names from the objects as defined within the project model schema 401.

Other features can be achieved by the loader 402 as well. For example, the each namespace can be associated with its own unique access rights and configuration settings defined by policy that the loader 402 enforces and establishes when the objects are loaded into their respective namespaces.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for object namespace resolution residing in a non-transitory computer-readable storage medium and for execution on a machine, comprising:
   receiving a request to load an object, the object is a particular resource that processes as executable instructions on the machine;
   resolving a namespace for the object that is specific to the object in response to the request, the namespace is separate from other namespaces associated with other objects of a project and the object also having multiple different and disparate namespaces from the namespace and the multiple different and disparate namespaces exists together within a same project processing environment for the project with the namespace; and
   loading the object to that namespace to satisfy the request, wherein said loading includes simultaneously loading the object or selective portions of the object to a second and entirely different namespace from the namespace in response to a namespace attribute of the object that declares the namespace and the second namespace.

2. The method of claim 1, wherein receiving further includes iterating a project model schema to load the object and multiple other objects associated with the project for processing.

3. The method of claim 1, wherein resolving further includes identifying the namespace as being inherited from a previous object, wherein the previous object declared the namespace as an attribute of that previous object.

4. The method of claim 1, wherein resolving further includes identifying the namespace as a value associated with a namespace attribute declared in the object.

5. The method of claim 1, wherein resolving further includes resolving the namespace by using a name assigned to the object to question a namespace object that responds with the namespace in response to that name.

6. The method of claim 5, wherein resolving further includes recognizing the name as an object hierarchy to which the object belongs.

7. The method of claim 1 further comprising one or more of the following:
   assigning access rights to the object in response to policy evaluation that utilizes the namespace;
   selectively encrypting portions of the object in response to the namespace; and
   porting selective portions of the object to an entirely different namespace from the namespace.

8. A machine implemented method residing in a non-transitory computer-readable storage medium and for execution on a machine, comprising:
   parsing an object schema to load an object into a project processing environment, the object is a particular resource that processes as executable instructions on the machine;
   determining an object name from the object schema;
   using the object name to resolve a namespace for the object unless the namespace is declared within the object schema, the namespace is specific to the object and separate from other namespaces used by other objects of a project within the project processing environment, and the object having multiple different and disparate namespaces; and
   loading the object to the namespace within the project processing environment, wherein said loading includes simultaneously loading the object or selective portions of the object to a second and entirely different namespace from the namespace in response to a namespace attribute of the object that declares the namespace and the second namespace.

9. The method of claim 8, wherein using further includes consulting a namespace object with the object name to resolve the namespace.

10. The method of claim 8, wherein using further includes referencing an object hierarchy using the object name to obtain the namespace as an inherited namespace from another object of the object hierarchy.

11. The method of claim 8, wherein using further includes recognizing that the namespace is declared in the object schema and maintaining that namespace as an override to a previous namespace that was to be associated with the object name.

12. The method of claim 8, wherein loading further includes setting access rights and security roles on the object in response to the namespace and in view of policy evaluation.

13. The method of claim 8, wherein loading further includes selectively configuring policies and operational settings for the object in response to the namespace.

14. A machine-implemented system, comprising:
- a machine having an object implemented in a non-transitory machine-accessible and readable medium and to process on the machine; and
- the machine also having an object loader implemented in a non-transitory machine-accessible and readable medium and to process on the machine;
- wherein the object loader selectively loads the object to a particular namespace, the namespace is independent of other namespaces for other objects and different from the other namespaces and the namespace is specific to the object, the object having multiple different and disparate namespaces, wherein the object loader further loads the object or selective portions of the object to a second and entirely different namespace from the namespace in response to a namespace attribute of the object that declares the namespace and the second namespace, and wherein the object and the other objects belong to a same object hierarchy, the object is a particular resource that processes as executable instructions on the machine.

15. The system of claim 14, wherein the object loader resolves the namespace via inheritance from the object hierarchy.

16. The system of claim 14, wherein the object loader resolves the namespace via an assigned namespace attribute value declared in the object.

17. The system of claim 14, wherein the object loader resolves the namespace by consulting a namespace object with a name for the object to acquire the namespace.

18. The system of claim 14, wherein the object loader sets resource roles, access rights, and configuration settings for the object within the namespace based on the namespace associated with the object.

19. A machine-implemented system, comprising:
- a machine having a project model schema implemented in a non-transitory machine-accessible and readable medium and that defines objects which process on the machine; and
- the machine also having a loader implemented in a non-transitory machine-accessible and readable medium and to process on the machine;
- wherein the loader parses the project model schema to selectively load an object into a first namespace and selective load portions of the object to a second and entirely different namespace from the first namespace in response to a namespace attribute of the object that declares the first namespace and the second namespace, the loaded object or portions thereof in their respective namespaces cooperate as a project defined by the project model schema, and each namespace is resolved by the loader from the project model schema, each namespace being particular to a particular object and the particular object having multiple different and disparate namespaces, and wherein the namespaces exists together within a same project processing environment for the project, the object being a particular resource that processes as executable instructions on the machine.

20. The system of claim 19, wherein some of the namespaces are explicitly defined within the project model schema via attribute declarations assigned to some of the objects.

21. The system of claim 19, wherein some of the namespaces are implicitly resolved via relationships between some of the objects that are present within the project model schema.

22. The system of claim 19, wherein the namespaces are resolved by consulting a namespace object with names from the objects as defined within the project model schema.

23. The system of claim 19, each namespace includes its own unique access rights and configuration settings defined by policy.

* * * * *